United States Patent
Forbis, Sr. et al.

[11] Patent Number: 6,161,362
[45] Date of Patent: Dec. 19, 2000

[54] SHADE COVER WITH EVAPORATIVE COOLING

[76] Inventors: Jack R. Forbis, Sr.; Ann R. Forbis, both of 283 Sundown Dr., Waco, Tex. 76712

[21] Appl. No.: 09/067,380

[22] Filed: Apr. 27, 1998

[51] Int. Cl.$^7$ ..................................................... E04B 7/14
[52] U.S. Cl. ............................... 52/745.06; 52/1; 52/168; 52/222; 47/27; 47/31; 47/28.1
[58] Field of Search ........................... 52/745.06, 1, 168, 52/222; 169/5, 56, 60, 61, 68; 160/371, 380, 135, 87, DIG. 7; 47/20, 26, 27, 31, 28.1; 135/88.11, 88.1

[56] References Cited

U.S. PATENT DOCUMENTS

| | | | |
|---|---|---|---|
| 1,720,232 | 7/1929 | North | 160/DIG. 7 X |
| 2,688,822 | 9/1954 | King | 47/28.1 |
| 2,889,664 | 6/1959 | Olshansky | 47/28.1 |
| 2,974,442 | 3/1961 | Womelsdorf | 47/26 |
| 3,788,542 | 1/1974 | Mee . | |
| 3,990,532 | 11/1976 | Robinson . | |
| 4,020,826 | 5/1977 | Mole . | |
| 4,068,404 | 1/1978 | Sheldon | 47/26 |
| 4,194,319 | 3/1980 | Crawford | 47/27 |
| 4,391,865 | 7/1983 | Constance | 160/DIG. 7 X |
| 4,498,262 | 2/1985 | Garcia . | |
| 4,562,675 | 1/1986 | Baigas, Jr. et al. | 160/DIG. 7 X |
| 4,730,423 | 3/1988 | Hughes . | |
| 4,732,012 | 3/1988 | Thorpe . | |
| 4,763,440 | 8/1988 | James | 47/27 X |
| 5,083,396 | 1/1992 | Traut | 47/28.1 |
| 5,365,703 | 11/1994 | Zeidler | 52/62 |
| 5,400,848 | 3/1995 | Gainer | 160/DIG. 7 X |
| 5,423,150 | 6/1995 | Hitchcock . | |
| 5,497,633 | 3/1996 | Jones et al. . | |
| 5,502,929 | 4/1996 | Daniels . | |
| 5,598,719 | 2/1997 | Jones et al. | 62/304 |
| 5,605,007 | 2/1997 | Hinsperger | 47/28.1 X |

*Primary Examiner*—Laura A. Callo
*Assistant Examiner*—Phi Dieu Tran A
*Attorney, Agent, or Firm*—Dennis T. Griggs

[57] ABSTRACT

A roof-mounted shade assembly for reducing solar heat gain includes an array of fabric panels that are tightly stretched between upright support posts in an operative position overlying and spaced from the roof of a building structure. Several spray nozzles periodically discharge water spray in the form of mist or fog into the space between the fabric panels and the building roof. The fabric panels become saturated with water spray, and fog/mist water droplets are in heat transfer contact with the roof surface and with the wet fabric panels. Thermal energy from the building structure is transferred to the surrounding atmosphere by convection and evaporative cooling as wind currents sweep across the wet fabric panels and the wet roof surface. The water-absorbent fabric panels simultaneously screen direct solar radiation and function as a thermal wick for transferring heat energy from the building structure.

2 Claims, 4 Drawing Sheets

SHADE COVER WITH EVAPORATIVE COOLING

BACKGROUND OF THE INVENTION

This invention relates generally to shields and shade apparatus for reducing the solar heat gain of building structures, and in particular to a roof-mounted fabric shade panel that is periodically misted with water to improve the transfer of thermal energy from a building structure to the surrounding atmosphere by wind convection and (evaporative cooling.

Heat, a form of kinetic energy, is transferred in three ways: conduction, convection and radiation. The transfer of heat energy by radiation makes possible the transfer of large amounts of heat from the sun to the earth. During the summer months, the roof of a building structure becomes quite hot because of radiation from the sun. Conduction carries the heat through the roof where it is distributed into the attic space by radiation and convection. The flow of heat through the roof can be reduced somewhat by applying insulation to the underside of the roof. Also, heated air in the attic space may be removed through vent louvers in the roof.

Comfort air conditioning refers to control of living spaces inhabited by people to promote their comfort, health or productivity. Spaces in which air is conditioned for comfort include houses, office buildings, hotels and factory work areas. Heat is transmitted through all parts of the building structure, which includes walls, floors, ceilings and windows. Whether heat enters or leaves the building space depends upon whether the outside building surfaces are warmer or cooler than the inside surfaces. Thermal insulation is installed, typically in the attic and walls, to reduce the overall thermal conductance of the building enclosure.

Solar heating represents a large percentage of heat gain through walls and roofs of building structures. During daylight hours, a building structure acts as a heat sink, and absorbs large quantities of thermal energy from the sun. This thermal energy is conducted and radiated throughout the building, with the result that the temperature of the living space within the building will rise. Comfort air conditioning is employed to maintain the temperature and humidity of air within the living space within acceptable limits.

Some commercial building structures have a flat, tar-and-gravel-type roof with air conditioning units mounted on the roof. During daylight hours, especially on non-cloudy days, radiant solar energy causes heating of the roof material and of the air conditioning units. In turn, heat is conducted through the roof into the ceiling and walls of the building structure. The radiant solar heat increases the overall skin temperature or surface temperature of the building structure, and results in an increase in the ambient air temperature within the living space enclosed by the structure. This increases the work load on the air conditioning system and results in a corresponding increase in the energy operating costs for that structure.

The practice of artificial shading has been applied extensively for various purposes, including the shading of outdoor activity spaces, for example patios, play areas, walkways and the like. Various coverings and shields have been proposed for building shade and cooling purposes. The following U.S. patents are representative of the prior art in the field of this invention:

| U.S. Pat. No. | Inventor | Title of Invention |
| --- | --- | --- |
| 5,598,719 | Jones et al | Evaporative Cooling Apparatus |
| 5,497,633 | Jones et al | Evaporative Cooling Unit |
| 4,498,262 | Garcia | Solar Shield Assembly |
| 5,502,929 | Daniels | Combination Wind and Sun Barrier |
| 4,730,423 | Hughes | Apparatus and Method for Protecting Cooling Units |
| 4,732,012 | Thorpe | Energy Efficient Evaporative Cooler Cover Apparatus |
| 3,788,542 | Mee | Environmental Control Method and Apparatus |

U.S. Pat. Nos. 5,598,719 and 5,497,633 disclose an overhead pavilion structure on which spray nozzles are mounted for producing a mist or fog within a lounge area underlying the structure, with the air temperature being reduced by evaporative cooling. The overhead structure is provided by upright conduits through which pressurized air is circulated.

U.S. Pat. No. 4,498,262 discloses a solar shield assembly in which metal panels are suspended above a building roof structure for blocking solar radiation.

U.S. Pat. No. 5,502,929 discloses perforated steel barrier panels mounted on upright posts for blocking wind flow and for providing shade.

U.S. Pat. No. 4,730,423 discloses a vinyl-coated fiberglass screen that is mounted on support posts for shielding an air conditioning unit from direct solar radiation.

U.S. Pat. No. 4,732,012 discloses an energy-saving panel composed of thermal insulation material for protecting an air conditioning unit from direct solar radiation.

U.S. Pat. No. 3,788,542 discloses a water spray nozzle for producing fog/mist within a greenhouse enclosure.

BRIEF SUMMARY OF THE INVENTION

The shade assembly of the present invention includes water-absorbent fabric panels for screening solar radiation and spray nozzles for producing a fog or mist in a space between the fabric panels and a building structure. According to this arrangement, heat gain is reduced by the fabric panels which block direct solar radiation, and heat radiated from the building structure is transferred to the overhead wet fabric panels, with the heat load being further transferred to the surrounding atmosphere by convection and evaporative cooling as wind currents sweep across the wet fabric panels. The water-absorbent fabric panels simultaneously screen direct solar radiation and transfer heat from the building structure to the surrounding atmosphere by thermal wicking action.

According to the preferred embodiment, the roof-mounted solar shield assembly includes an array of fabric panels supported on a roof surface by upright support posts. Individual fabric panels are tightly stretched between the upright support posts. Several spray nozzles are coupled to a water distribution conduit for discharging water spray in the form of mist or fog into the space between the fabric panels and the roof surface. Solar radiation is screened by the fabric panels, thus reducing heat gain from direct solar energy. Building heat is transferred from the roof structure as a result of evaporation of water droplets and water vapor that contact the roof surface. Additionally, thermal energy radiated from the building structure is absorbed by the wet fabric panels which function as a heat sink, with the heat energy being transferred from the wet fabric panels to the surrounding atmosphere by convection and evaporative cooling as wind currents sweep across the panels. The wet fabric panels simultaneously screen solar radiation and operate as a thermal wick for transferring heat energy from the building structure to the surrounding atmosphere.

BRIEF DESCRIPTION OF THE DRAWING

The accompanying drawing is incorporated into the specification to illustrate the preferred embodiments of the present invention. Throughout the drawing, like reference numerals designate corresponding elements. Various advantages and features of the invention will be understood from the following detailed description taken in connection with the appended claims and with reference to the attached drawing figures in which:

DETAILED DESCRIPTION OF THE INVENTION

Figure 1:
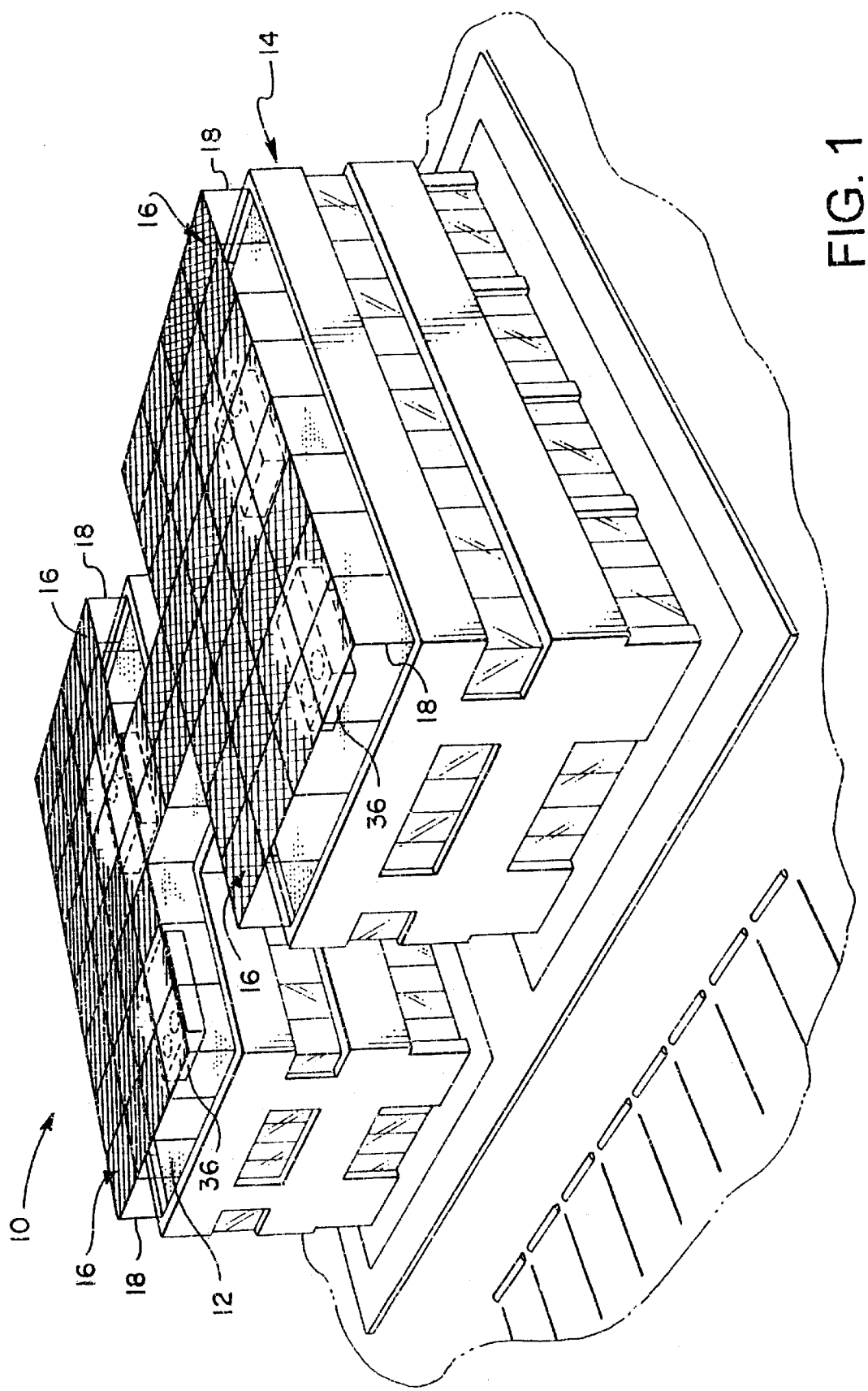
FIG. 1 is an overhead perspective view of an office building having a flat roof surface on which the shade cover apparatus of the present invention is installed in a horizontal operative position.

Preferred embodiments of the invention are described herein by referring to various examples of how the invention can be made and used. Like reference numerals are used throughout the description and several views of the drawing to indicate like or corresponding parts.

Figure 2:
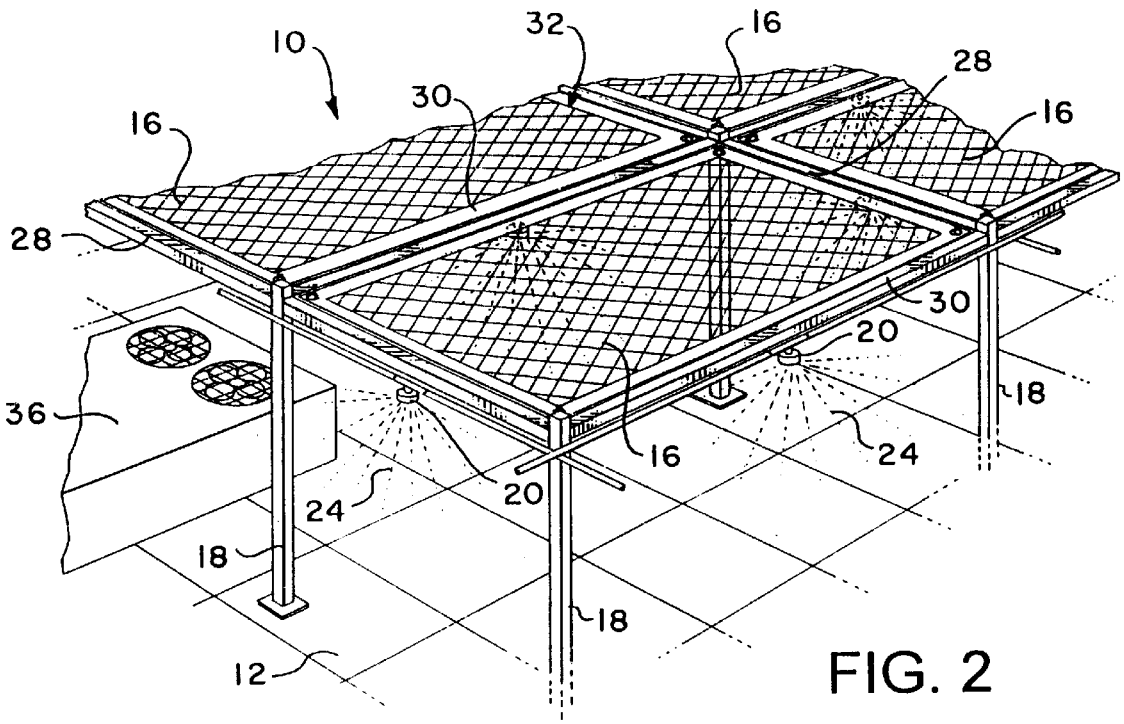
FIG. 2 is a close-up perspective view thereof, partially broken away.

Referring now to FIG. 1 and FIG. 2, the shade assembly 10 is installed in an operative position overlying the roof 12 of an office building 14 for the purpose of shielding the roof 12 from solar radiation. The shade assembly includes multiple shade screen fabric panels 16 that are stretched tightly between upright support posts 18 in an operative, solar shielding position overlying and spaced from the roof 12. The shade assembly 10 further includes multiple spray nozzles 20 that are coupled to a water distribution conduit 22 for discharging water spray 24 in the form of mist or fog into the space between the panels 16 and the roof surface 12. According to this arrangement, solar radiation is screened by the fabric panels 16, thus reducing heat gain caused by direct solar radiation.

Figure 3:
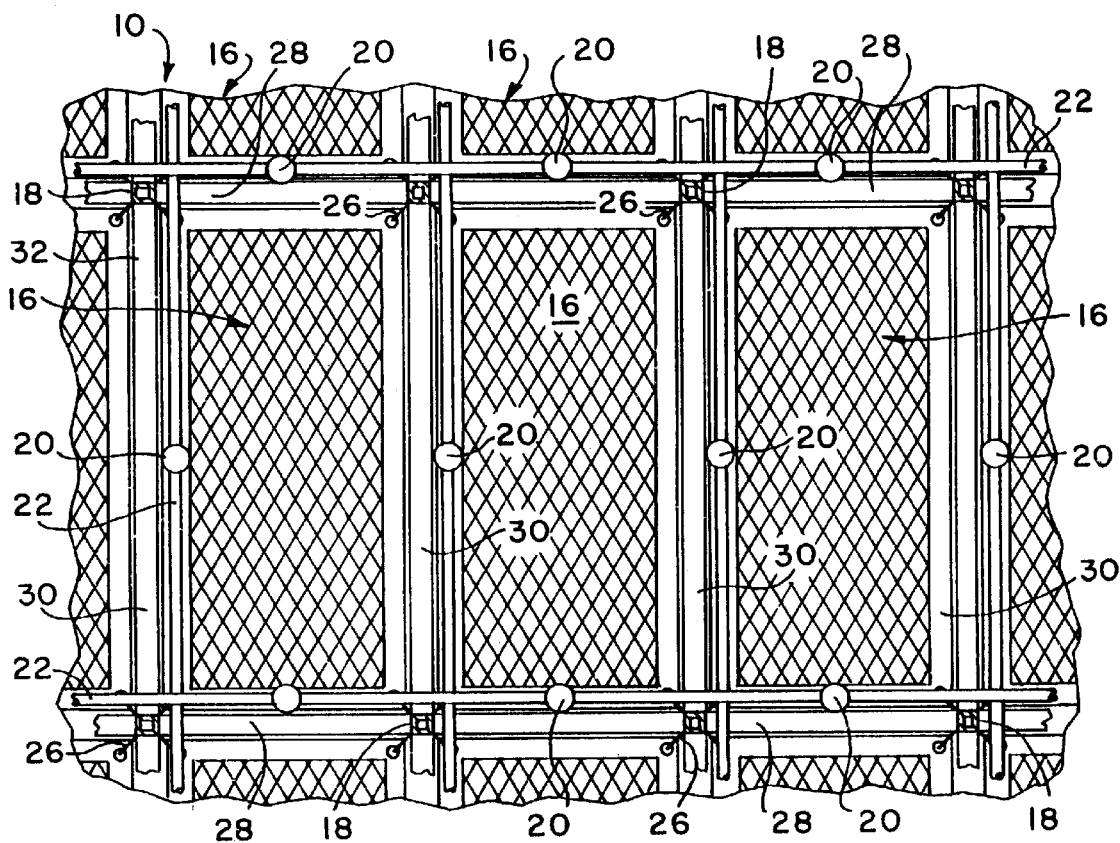
FIG. 3 is an underside plan view thereof.
Figure 4:
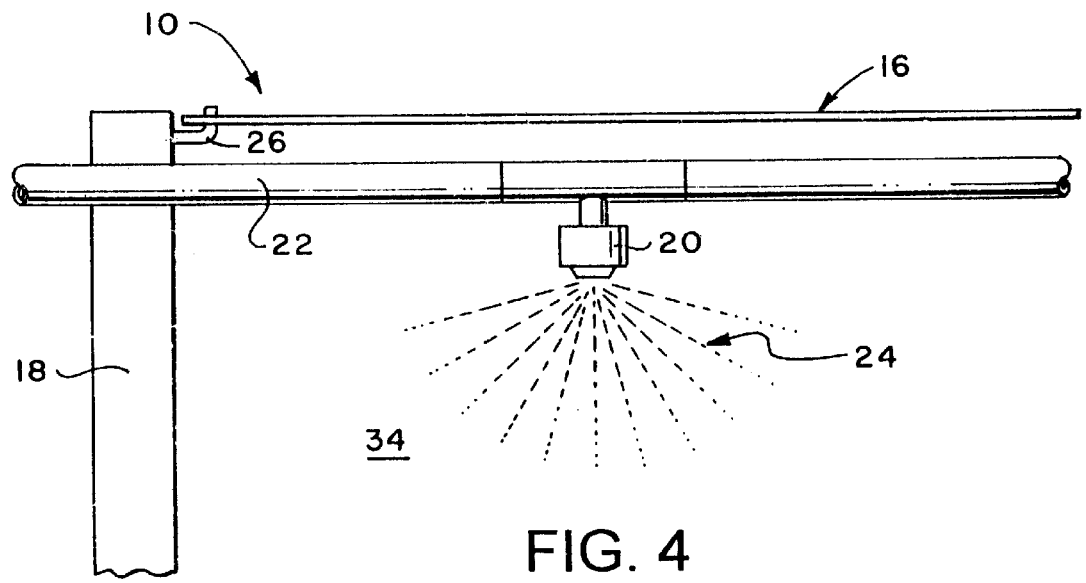
FIG. 4 is a side elevational view thereof, partially broken away.

Referring now to FIG. 3 and FIG. 4, the shade screen panels 16 are supported by retainer hooks 26 that are attached to the upright support posts 18. The upright support posts 18 are stabilized by multiple lateral beams 28 and transverse beams 30 that connect adjacent pairs of upright support posts, thereby defining a rectangular frame 32 that is horizontally disposed and vertically offset from the roof 12.

The water distribution conduit 22 is connected through appropriate valves and control equipment for periodically discharging water spray in the form of a fog or mist into the space 34 between the shade screen panels 16 and the roof 12. The duration and volume of water spray delivered is controlled by a clock timer and sensors that are responsive to temperature, humidity, solar intensity and time of day.

Figure 6:
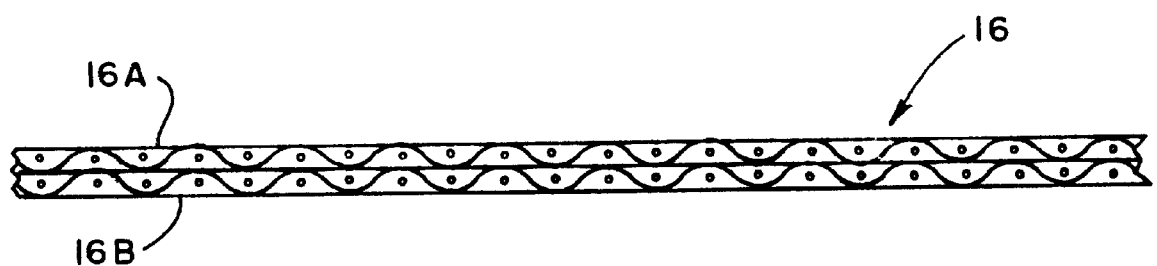

Preferably, the shade screen panels 16 are constructed of a water-absorbent material, for example woven fabric or knitted fabric material. According to one aspect of the invention, as shown in FIG. 6, the shade screen panel 16 includes a first panel 16A of water-absorbent fabric material having a white or silver color which renders the panel relatively reflective to solar radiation, and a second panel 16B of water-absorbent fabric material having a dark or black color that is relatively absorbent of thermal energy radiated from the roof 12. Preferably, the panel sections 16A, 16B are superimposed and overlap with each other with the energy-absorbent panel 16B being disposed between the reflective panel and the building structure 14. According to this arrangement, the white or silver colored panel 16A reflects a large amount of the incident solar radiation, while the underlying dark panel section 16B absorbs heat radiated through the roof 12 of the building 14.

According to an important aspect of the present invention, the heat load of the building structure 14 is transferred to the surrounding atmosphere by convection and evaporative cooling as wind currents sweep across the wet fabric panels 16. The water-absorbent fabric panels screen out direct solar radiation and simultaneously transfer heat from the building structure 14 to the surrounding atmosphere by thermal wicking action. That is, building heat is transferred through the roof structure 12 as a result of evaporation of water droplets and water vapor that contact the roof surface 12. Additionally, thermal energy radiated from the building structure 14 is absorbed by the relatively cool, wet fabric panels which function as a heat sink, with the heat energy being transferred from the wet fabric panels 16 to the surrounding atmosphere by evaporative cooling as the fog/mist water droplets evaporate. Moreover, thermal energy from the building structure is transferred to the surrounding atmosphere by convection as wind currents sweep across the wet fabric panels 16 and the wet roof surface 12. The water-absorbent fabric panels 16 thus screen direct solar radiation and function as a thermal wick for transferring heat energy from the building structure.

Various water-absorbent fabric materials can be used to good advantage in the construction of the shade screen panels 16. For example, the panel preferably is made of a knitted black polyethylene cloth, having a weave and thread density providing a shade factor in the range of 60%–90%. Although a knitted fabric is preferred, a flat woven weave fabric can be substituted.

In the exemplary embodiment, the shade screen panels 16 are rectangular and are constructed of polypropylene shade fabric, for example as sold under the trademark NICO-SHADE® by TC Baycor Corporation. For an 80% shade factor, the shade fabric has a weight of 3.7 ounces/square yard, an air porosity of 700 cfm, with the polypropylene yarn having an oval warp and a round fill.

The spray nozzles 20 are preferably overhead nozzles of the type sold under the trademark MISTY-MIST® by Dramm Company of Manitowic, Wis. One MISTY-MIST spray nozzle suitable for use in the present invention has a nozzle diameter of 1.00 mm and provides 0.22 gallons per minute of spray mist at 73 psi water pressure. Pressurized water is supplied to the misting nozzles under the control of a programmable controller, for example Model SC1C, sold by Sterling Corporation.

Figure 5:
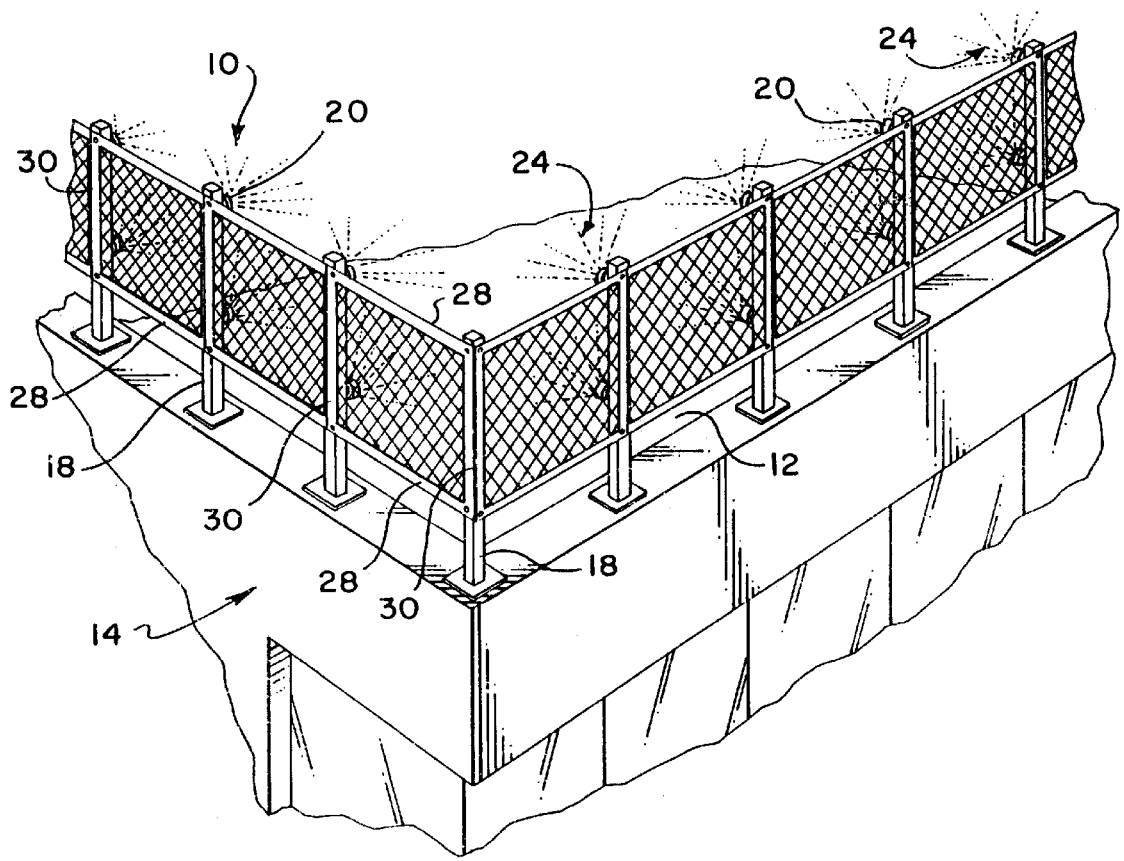
FIG. 5 is an overhead perspective view of a portion of the roof top of the building shown in FIG. 1, with the shade cover apparatus being installed in an upright operative position; and, FIG. 6 is a sectional view showing an alternative embodiment of a side screen having a dual panel construction.

Referring now to FIG. 5, the shade assembly 10 of the present invention can also be oriented in an upright, vertical configuration. Although the shade assembly 10 is shown in the exemplary embodiments as installed on an office building roof, it will be understood that the shade assembly can also be used for energy-saving purposes to cover single family dwellings, mobile homes, recreational vehicles, adjacent outdoor spaces, including permanent outdoor work areas, walkways and lounge areas.

Referring again to FIG. 2, the shade assembly 10 includes multiple shade screen panels 16 vertically spaced with respect to the roof's surface 12, and also overlying a roof-mounted air conditioning unit 36. Preferably, the shade screen panels 16 are located close to the roof surface, for example 3–4 feet, while allowing appropriate clearance with respect to the air conditioning unit, to minimize wind damage.

Although the exemplary embodiments of the present invention are intended to reduce energy consumption related to comfort air conditioning of building structures, the invention can also be used in other outdoor applications including, but not limited to, animal pens/shelters, swimming pools, golf course pavilions, tennis courts, daycare center/school play areas, park/zoo play areas, mobile homes, patios, carports, boat sheds, automobile/boat dealerships, road-side rest stops and recreational vehicle parks.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

What is claimed is:

1. A shade assembly comprising, in combination:

a frame;

a shade screen attached to the frame;

at least one spray nozzle mounted on the frame for discharging water spray or mist; and, wherein said shade screen comprises a first panel of water-absorbent fabric material of white or silver color rendering said first panel relatively reflective of solar radiation, and comprising a second panel of water-absorbent fabric material having a dark or black color that is relatively absorbent of radiant thermal energy, said first and second panels overlapping each other.

2. A shade assembly for installation in an operative solar screening position overlying a building roof structure, comprising, in combination:

a frame;

support means attached to the frame for supporting the frame a predetermined distance above a building roof structure thereby establishing an open air flow passage between the shade screen and the building roof structure when the shade assembly is installed in the operative solar screening position;

a shade screen attached to the frame, the shade screen including a first panel of water-absorbent fabric material having a white or silver color rendering said panel relatively reflective of solar radiation, and comprising a second panel of water-absorbent fabric material having a dark or black color that is relatively absorbent of radiant thermal energy, said first and second panels overlapping each other with the energy-absorbent panel being disposed between the reflective panel and the building roof structure when the shade assembly is installed in the operative solar screening position; and, at least one spray nozzle mounted on the frame for discharging water spray or mist into the air flow passage that is established when the shade assembly is installed in the operative solar screening position.

* * * * *